O. PADDOCK.

Match-Boxes.

No. 134,764. Patented Jan. 14, 1873.

Witnesses.

Inventor.
Oscar Paddock
by atty Hollok

UNITED STATES PATENT OFFICE.

OSCAR PADDOCK, OF WATERTOWN, NEW YORK.

IMPROVEMENT IN MATCH-BOXES.

Specification forming part of Letters Patent No. 134,764, dated January 14, 1873.

*To all whom it may concern:*

Be it known that I, OSCAR PADDOCK, of Watertown, Jefferson county, New York, have invented certain new and useful Improvements in Match - Safes, of which the following is a specification:

Match-safes have been made with two receptacles, one for the live matches and one for the dead ones, or those which have been ignited and partly burned; but hitherto the receptacle designed to contain the dead matches has been so shaped and fashioned that the stumps and dead ends contained in it can be reached as readily with the fingers as the live matches contained in the other receptacle, and consequently a person in the dark, when desirous of getting a match for the purpose of striking a light, would be quite as likely to take hold of a dead match as a live one. It is the object of my invention to obviate this annoyance and inconvenience; and to this end, while my improved match-safe contains two receptacles, as heretofore, one for the live and one for the burned matches, I make the dead-match receptacle so deep, and of such contracted area in cross-section in comparison with its depth, that burned matches dropped into it cannot be reached and taken hold of by the fingers. I am enabled thus simply to entirely obviate the difficulty above named. For the purpose of greater convenience and facility in emptying the burned-match receptacle, I prefer to make it removable, so that when desired it can be separated from the safe and emptied without disturbing the live matches.

The manner in which my invention is or may be carried into effect will be readily understood by reference to the accompanying drawing, in which—

Figure 1:
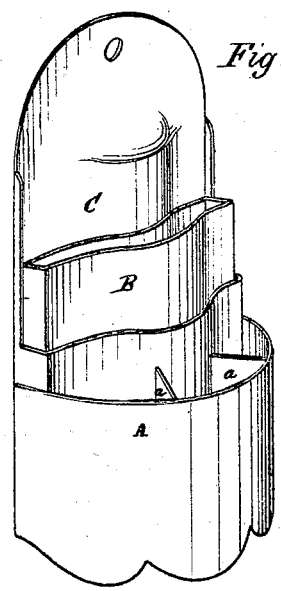
Figure 2:
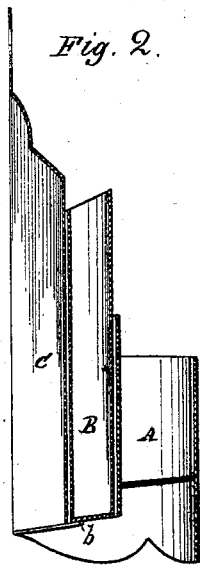
Figure 3:
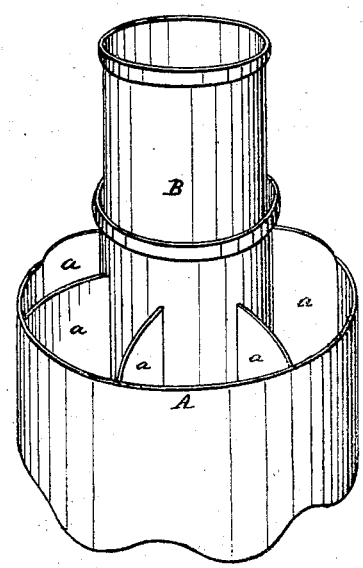

Figure 1 is a perspective view, and Fig. 2 is a transverse vertical section, of a match-safe made in accordance with my invention, and designed to be hung up against a wall. Fig. 3 is a perspective view, and Fig. 4 a vertical central section, of a match-safe embodying my invention, and designed to stand upon a table or other flat surface.

In each safe there is a receptacle, A, designed to contain live matches, and of the usual depth to allow access to be readily had to the matches therein. In this instance partitions *a* are employed to maintain the matches in an upright or partially upright position, and prevent them from falling down at full length on the bottom of the receptacle. The holder for the burned matches is shown at B in Figs. 1 and 2. Its depth considerably exceeds the length of the burned matches, and is made narrow so that the fingers cannot be inserted therein to take hold of the burned ends. This holder may be either stationary or removable, but I prefer, as above stated, the latter arrangement, which is shown in the drawing. The holder fits and slides in a pocket formed between the rear of the receptacle A and the back C of the safe, and is prevented from being inserted too far therein by a lug or stop, *b*, or some equivalent device at the lower end of the pocket. The back C of the safe is so shaped, as shown in Fig. 2, that the holder B can be removed from and replaced in its pocket without requiring the safe to be taken off from the nail upon which it is designed to hang.

Figure 4:
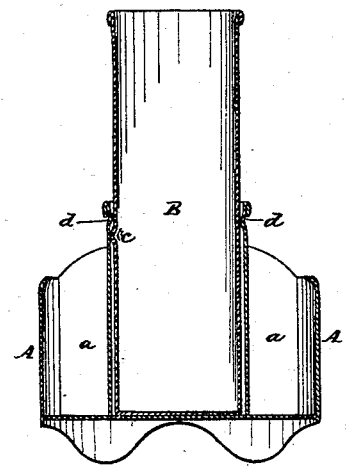

In the safe shown in Figs. 3 and 4, which is designed to rest upon a table or mantel, the live-match receptacle A is annular, and surrounds a cylindrical dead-match holder, B, which is of much greater depth than receptacle A, and is of contracted area in cross-section for the purposes already stated. This holder also is removable. It fits into a cylindrical socket, and is held in place by means of devices arranged somewhat like a bayonet-catch—that is, there is a lug or projection, *c*, on the holder B, which is intended to fit under a shoulder, *d*, around the inside of the upper part of the socket, there being at one point on the socket a vertical groove or passage through the shoulder *d*, which, when the holder is turned so as to bring the lug *c* opposite to said groove, will allow the lug to pass below or above the shoulder, according as the holder is being inserted in or withdrawn from the socket.

In the drawing, the dead-match holder is represented as above the live-match receptacle; but it is manifest that the position of the two may be reversed without departure from my invention.

With a safe constructed as I have described there is no possibility of mistaking the one receptacle for the other; and after the dead matches have once been dropped into their holder it is quite impracticable to insert the fingers far enough therein to take hold of the ends.

I do not, of course, claim a match-safe having two receptacles, one for live and the other for dead matches; nor do I claim, broadly, such a safe where the dead-match holder is removable.

What I do claim, and desire to secure by Letters Patent, is—

A match-safe made substantially as herein shown and described—that is to say, comprising a live-match receptacle and a dead-match holder, the latter, whether removable or stationary, being constructed of a depth considerably greater than the length of the burned match-sticks which it receives, and of such contracted sectional area in proportion to its depth as to practically remove the burned sticks beyond reach of the fingers, as set forth.

In testimony whereof I have signed my name to this specification before two subscribing witnesses.

OSCAR PADDOCK.

Witnesses:
 BENJ. R. MEIGS,
 FRANK SMITH.